March 11, 1941.                M. B. AUSTIN, JR                    2,234,640
                                  SERVICE FITTING
                               Filed Oct. 2, 1939
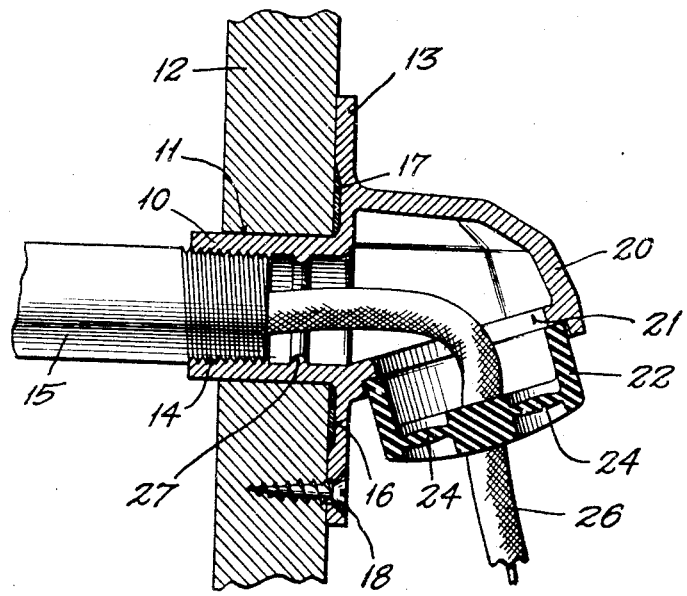
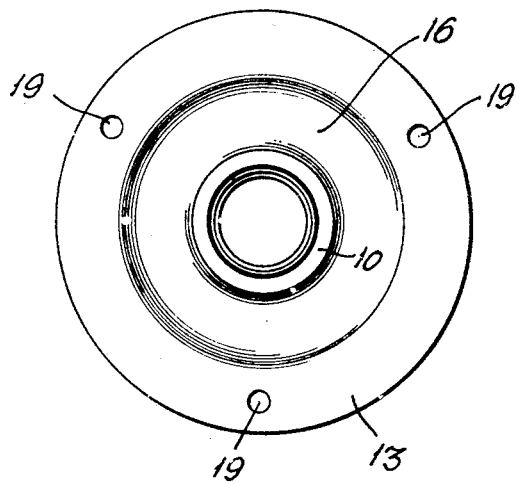
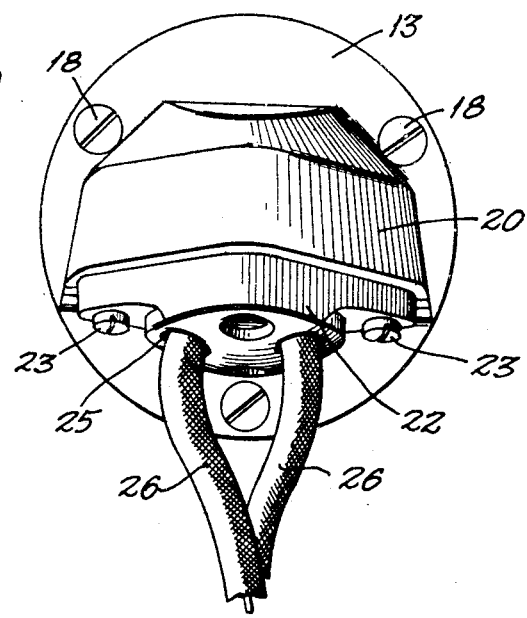
INVENTOR
Merritt B. Austin, Jr.
BY
ATTORNEYS Patented Mar. 11, 1941

2,234,640

UNITED STATES PATENT OFFICE 2,234,640

SERVICE FITTING

Merritt B. Austin, Jr., Winnetka, Ill., assignor to The M. B. Austin Company, Chicago, Ill., a corporation of Illinois Application October 2, 1939, Serial No. 297,443

3 Claims. (Cl. 174—79)

This invention relates to an electrical fitting, and, more particularly, to a service fitting through which wires are led from the exterior into a building.

In electrical installations in rural sections, a great many farm buildings are being equipped with electrical power.

In order to lead the wires into the building, it is necessary to provide a protected fitting which can be easily and readily installed and which will protect the opening through which the wires pass against the weather.

According to the present invention, a simple but effective fitting has been provided which can be readily and easily applied to barns or the like structures and which will seal the opening, through which the wires pass, against the weather and protect the cables against damage.

This is accomplished by providing a tubular member which will pass completely through the wall and through which the cables can be passed. The tubular member is provided at its outer end with a circular flange having means thereon for sealing the opening against the passage of moisture or air. This means, in the preferred form of the invention, comprises an annular recess formed in the back of the flange or plate adjacent the opening. The recess will receive a sealing material which, when the plate is secured in position, will effectively seal the opening.

The plate can be secured in place by means of screws passing therethrough and into the structure to which it is attached, or by being drawn into engagement with the surface by means secured to the tubular member on the interior of the structure.

The outer end of the tubular member is protected by means of a projecting hood formed integrally with the face of the flange and having an opening at the bottom thereof through which the cables may be passed. The opening in the bottom of the hooded member is closed by a suitable insulating bushing which also securely holds the cable in place.

The tubular member can be threaded on its inner end to receive a conduit, connector, outlet box or any other fitting, and the service fitting can thus be held in position by these means, in addition to the securing of the plate on the outer surface of the wall. If desired, a clamp may be threaded on the tubular member to engage the inner surface of the wall and draw the plate into sealing position.

When installing fittings of the present invention, it is merely necessary to rough out a hole in the wall of the barn, for example, of sufficient size to receive the tubular member on the fitting. The fitting is then located in position with the recess on the back of the plate filled with a sealing compound. Screws are driven home through suitable apertures formed in the plate, and the fitting is completely mounted on the wall.

The insulating bushing is removed and the cable passed therethrough into the fitting and through the neck. The bushing is then replaced and attached to the fitting. The wires can then pass into a conduit which can be threaded into the tubular member and into an outlet box or connector, as desired.

It will be seen, therefore, that the fitting of the present invention greatly simplifies the installation of a service fitting through which electrical cables can be passed into a structure and completely seals the opening against moisture and the weather.

Other features and advantages of the invention will be apparent from the specification and claims when taken in connection with the drawing, in which:

Figure 1 is a longitudinal sectional view of the device in position on a wall.

Fig. 2 is a rear view of the device, showing the recess in the back plate.

Fig. 3 is a front view of the device, showing the screws positioned in the flange.

The fitting of the present invention provides a simple and readily installed weatherproof fitting which not only protects the cable as it passes into the interior of the building, but also forms an effective seal for the opening through which the fitting extends.

This fitting, as is shown in Fig. 1, comprises a tubular member 10 adapted to pass, preferably completely through an aperture 11 formed in a wall 12 of the structure in which it is mounted. The tubular member is provided at its outer end with an enlarged flange 13 which forms a face plate for the fitting to engage the outer surface of the wall when the fitting is in place, and at its inner end, means, preferably threads 14, by which a conduit 15 or other fitting or clamp can be secured thereto.

While the flange 13 extends over a considerable area of the outer surface of the building adjacent the opening through which the tubular member extends, the present invention provides means for sealing the opening against the weather so as to prevent moisture or winds from passing therethrough.

This is accomplished by providing a recess 16 in the back of the flange 13, preferably adjacent the tubular member. The recess is filled with a sealing compound 17 so that when the flange is secured in place the opening will be sealed. Preferably, a generous portion of sealing material is placed in the recess, and, when the flange is drawn into tight engagement with the outer surface, will be forced in through the aperture around the tubular member to also seal the opening at that point.

The sealing material, so positioned, is completely protected so that it cannot be tampered with and cannot receive knocks from sharp implements which might injure the seal produced thereby.

The flange can be secured in position by the means of screws 18 passing through a plurality of openings 19 in the plate, or can be held in position through the connection of the tubular member with the conduit 15, or other fitting located on the interior of the building, which will effectively clamp the plate against the outer surface of the building.

Projecting from the outer surface of the flange 13 so as to protect the open end of the tubular member 10 is an integrally formed hooded member 20 having an opening 21 disposed on the undersurface thereof so as to be also protected by the hood against the elements, such as rain, snow and wind.

The opening 21 is closed by means of an insulating bushing 22 secured in place by screws 23 threaded into the hooded member 20, as shown in Fig. 3.

As shown in Figs. 1 and 3, the bushing is provided with a plurality of buttons 24 which may be readily punched out to form openings 25 through which the wires or cables 26 can pass.

Thus it will be seen when it is desired to lead electric cables into a building, such as a barn or the like, the wall of the barn is provided with a suitable aperture 11, which may be drilled or roughed-out to the size of the tubular member. The recess 16 in the back of the face plate 13 is filled with the sealing material, and the tubular member passed through the opening in the wall and the plate secured in engagement with the face of the building by means of the screws 18 passing therethrough, or by means connected to the tubular member on the inside of the building and drawing the plate 13 into engagement with the outer surface.

The wires 26 can then be fed through the insulating bushing 22 and through the tubular member, and the insulating bushing then secured in the opening in the hooded member.

In the illustrated form of the invention, a bead 27 is provided in the tubular member, as is best shown in Fig. 1, to guide the cable away from the threads at the end thereof, and thus protect the insulation on the cables as they are fed through the fitting.

The fitting, because of its simplicity, is thus readily and easily installed. When installed, it not only seals the opening through which the cables pass, but it will completely seal the opening through which the fitting passes.

Variations and modifications may be made within the scope of this invention and portions of the improvements may be used without others.

I claim:

1. A service entrance fitting to be applied over a rough-cut hole in the wall of the building to be serviced, comprising a cylindrical tubular neck portion adapted to extend horizontally into and through said hole in the wall, said neck portion having at one end an internally threaded bore to receive and support the threaded end of an electric conduit through which the service wires are led to the wire system of a building; and a face plate portion integral with and surrounding the other end of the cylindrical tubular neck portion, said face plate having a rear surface lying in a plane substantially perpendicular to the axis of the neck and a protecting hood projecting from its front surface and overlying the end of the tubular neck portion, the portion of the face plate extending beyond the hood constituting an annular flange for the fitting of substantially larger outside diameter than the diameter of the neck portion so as to conceal and cover said rough-cut hole and having screw-receiving means whereby the fitting may be secured to the building, with the neck portion extending through the hole, and drawn into engagement with the exterior of the wall to seal the joint at the hole, said fitting having at the junction of the cylindrical tubular neck portion and the rear surface of the face plate a circumferential recess for receiving a mass of plastic sealing compound to close the joint between the fitting and the wall at the rough-cut hole therein when the face plate is drawn into contact with the wall.

2. A service entrance fitting to be applied over a rough-cut hole in the wall of a building to be serviced, comprising a tubular neck portion adapted to extend horizontally into and through said hole in the wall, said neck portion having at one end an internally threaded bore to receive and support the threaded end of an electric conduit through which service wires are led to the wiring system of the building; and a face plate portion integral with and surrounding the other end of the tubular neck portion, said face plate having a rear surface lying in a plane substantially perpendicular to the axis of the neck and a protecting hood projecting from its front surface and overlying the end of the tubular neck portion, said hood having an apertured closure member through which the wires may pass into the fitting, the portion of the face plate extending beyond the hood constituting an annular flange for the fitting of substantially larger outside diameter than the diameter of the neck portion so as to conceal and cover said rough-cut hole, the rear surface of the face plate having a cavity closely circumscribing the neck portion where it joins the face plate portion for retaining a quantity of sealing compound used with the face plate to close the joint between the fitting and the wall of the building, said annular flange having screw-receiving means whereby the fitting may be secured to the building, with the neck portion extending through the hole, and drawn into engagement with the exterior of the wall to cause the sealing compound to be squeezed into engagement with the wall and into the hole around the neck to seal the joint around the hole.

3. A service entrance fitting to be applied over a rough-cut hole in the wall of a building to be serviced, comprising a tubular neck portion adapted to extend horizontally into and through said hole in the wall, said neck having at one end an internally threaded bore to receive and support the threaded end of an electric conduit through which the service wires are led to the wiring system of the building; and a face plate portion integral with and circumscribing the other end of said tubular neck portion, the rear surface of the face plate providing a sealing material receiving surface and being substantially perpendicular to the axis of the neck portion and the front surface thereof having an integral hood portion projecting therefrom and provided with an apertured closure member through which may pass service wires extending into the fitting, the portion of the face plate extending beyond the hood constituting an annular flange for the fitting of substantially larger outside diameter than the diameter of the neck portion so as to conceal and cover said rough-cut hole and having apertures to receive means for drawing the face plate into engagement with the wall whereby the fitting may be secured to the exterior of the wall with the neck extending through said rough-cut hole.

MERRITT B. AUSTIN, Jr.